United States Patent [19]

Takezoe et al.

[11] Patent Number: 5,448,231
[45] Date of Patent: Sep. 5, 1995

[54] METHOD AND APPARATUS FOR TRANSMITTING SIGNALS ON A TRANSMISSION LINE

[75] Inventors: Fumihiko Takezoe; Hironori Mine; Kenji Asanuma, all of Kanagawa, Japan

[73] Assignee: Fuji Electric Co., Ltd., Kanagawa, Japan

[21] Appl. No.: 890,082

[22] Filed: May 29, 1992

[30] Foreign Application Priority Data

May 30, 1991 [JP] Japan ................... 3-153756
Jul. 16, 1991 [JP] Japan ................... 3-174983

[51] Int. Cl.⁶ ............................................ H04M 11/04
[52] U.S. Cl. ................ 340/870.39; 340/310.01; 340/310.06; 340/509
[58] Field of Search ............. 340/870.38, 870.39, 340/825.77, 825.78, 505, 509, 310.01, 310.06

[56] References Cited

U.S. PATENT DOCUMENTS

| | | | |
|---|---|---|---|
| 3,786,501 | 1/1974 | Marnerakis | 340/509 |
| 4,206,449 | 6/1980 | Galvin et al. | 340/505 |
| 4,399,440 | 8/1983 | Douglas | 340/870.39 |
| 4,568,935 | 2/1986 | Phillips et al. | 340/505 |
| 4,785,285 | 11/1988 | Teich et al. | 340/505 |
| 4,847,595 | 7/1989 | Okamoto | 340/505 |
| 4,910,628 | 3/1990 | Minagawa et al. | 340/310 R |
| 5,017,905 | 5/1991 | Yuchi | 340/505 |
| 5,083,107 | 1/1992 | Takahashi et al. | 340/505 |

FOREIGN PATENT DOCUMENTS

| | | |
|---|---|---|
| 0319820A1 | 6/1989 | European Pat. Off. . |
| 0386659A2 | 9/1990 | European Pat. Off. . |
| 2205010 | 11/1988 | United Kingdom . |

OTHER PUBLICATIONS

"Guidelines for Physical Layer Testing Low Speed, Voltage Mode"; distributed by the International Fieldbus Consortium and dated Apr. 18, 1991.

*Primary Examiner*—Brent Swarthout
*Assistant Examiner*—Daniel J. Wu
*Attorney, Agent, or Firm*—Finnegan, Henderson, Farabow, Garrett & Dunner

[57] ABSTRACT

The present invention provides a method and apparatus for transmitting signals on a transmission line, the transmission line having a DC current flowing therethrough and having a plurality of terminals connected thereto in a multidrop fashion. Each of the terminals is capable of drawing a portion of the DC current. A signal is transmitted on the transmission line by varying the portions of the DC current drawn by the terminals. When the signal is not being transmitted the total amount of the DC current drawn by the terminals from the transmission line is maintained at a value smaller than an average amount of the DC current drawn by the terminals from the transmission line when the signal is being transmitted.

4 Claims, 8 Drawing Sheets

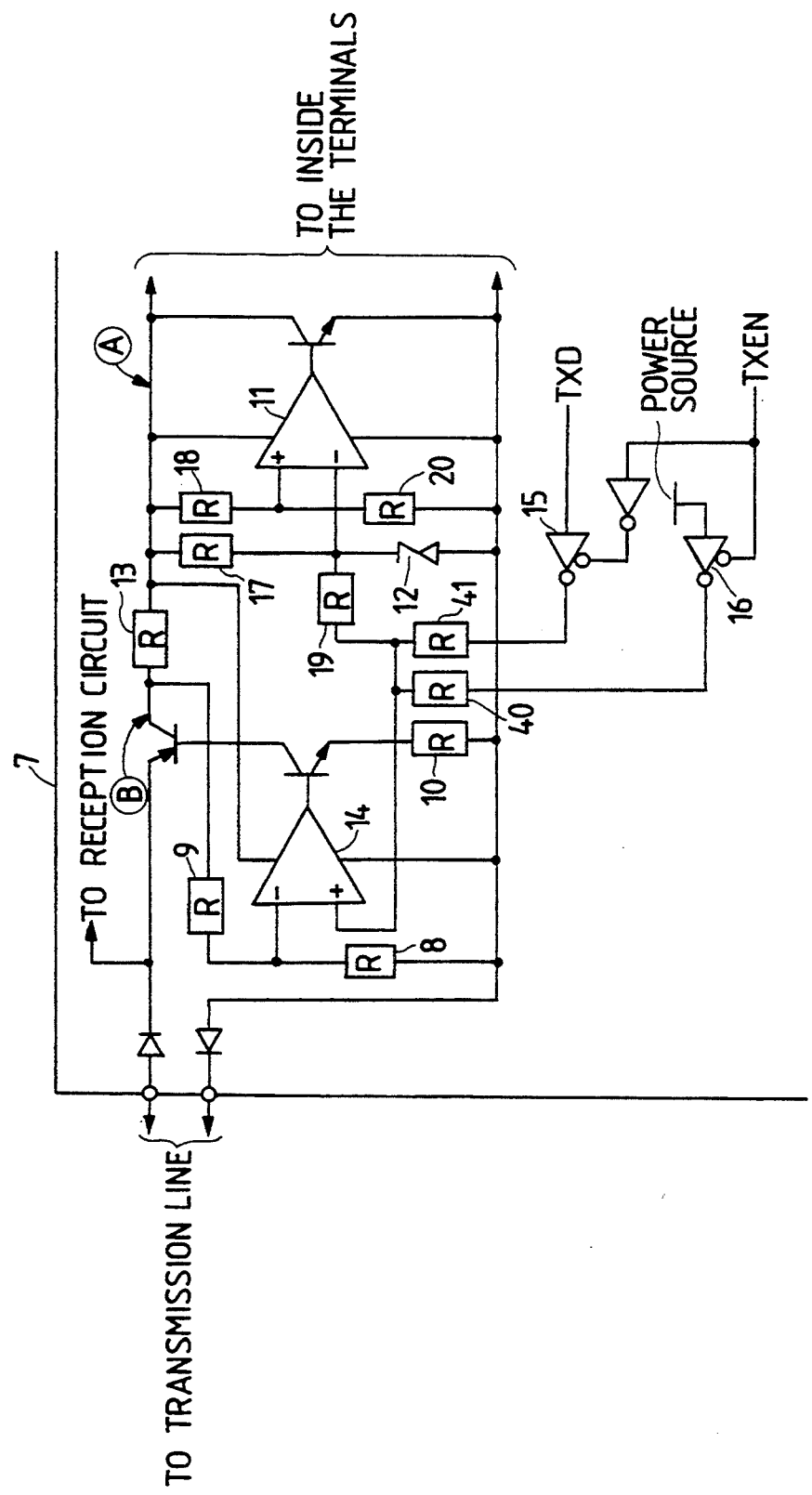

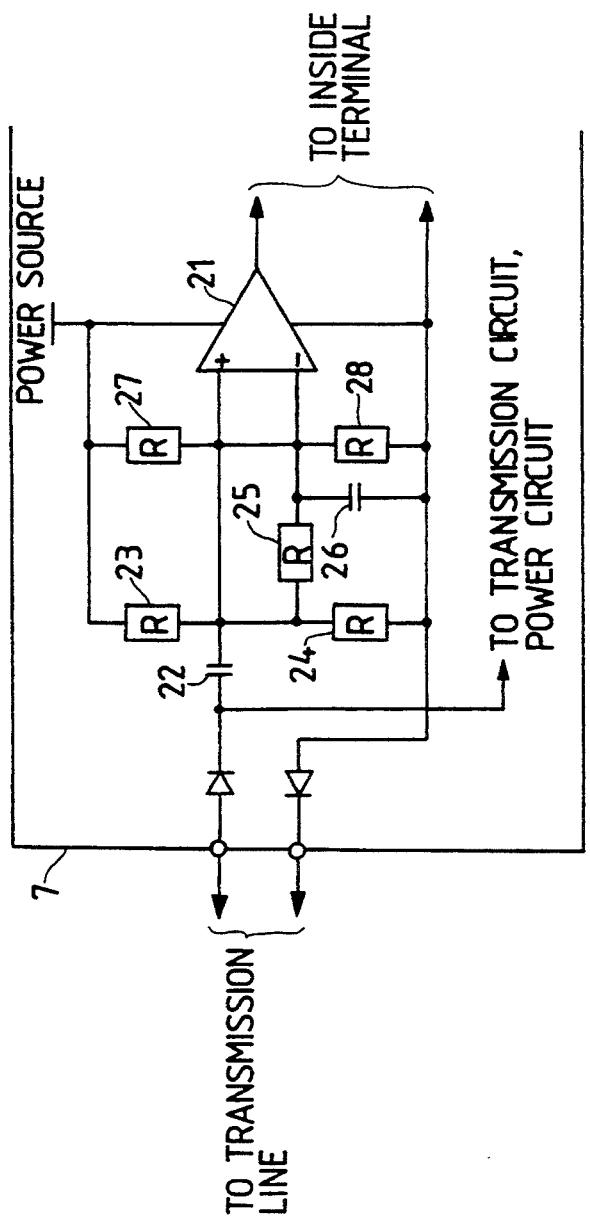

METHOD AND APPARATUS FOR TRANSMITTING SIGNALS ON A TRANSMISSION LINE

BACKGROUND OF THE INVENTION

1. Field of the Invention

The present invention relates to a method and apparatus for transmitting signals on a transmission line and, more specifically, to a method and apparatus for transmitting signals on a transmission line in an instrinsically safe explosion proof transmission system (hereinafter referred to as an "ISEP transmission system").

In particular, the present invention concerns the communication of signals in a communication standard "Field Bus." Standardization of such a field bus is currently under way in organizations such as the IEC (International Electrotechnical Commission). The present invention is applicable, for example, in industrial instrumentation and control applications, wherein a DC power is supplied to terminals connected to a transmission line and communication is effected between the terminals by superimposing an AC signal on the DC signal.

2. Description of the Related Art

FIG. 7 illustrates an example of a general configuration of an ISEP transmission system. As shown in FIG. 7, the ISEP transmission system comprises a bus power source 1, inductors 2a and 2b, a Zener barrier 3, terminators 4a and 4b, a transmission line 5, a master terminal 6, and terminals 7. It should be understood that D denotes a dangerous area in which, for example, an explosive gas is present or is likely to be present, while S denotes a safe area which is free of such a gas.

The transmission line 5 comprises, for example, a pair of conductive wires. The Zener barrier 3, in its normal state, can be regarded simply as a series resistor and, as shown in FIG. 7, the Zener barrier 3 is provided at a boundary of the safe area S and the dangerous area D in order to limit the voltage and current flowing through the dangerous area D.

The bus power source 1 comprises, for example, a fixed voltage source for supplying a DC power to the terminals 7 via the Zener barrier 3 and the transmission line 5. As shown in FIG. 7, the terminals 7 are connected in a multidrop fashion to the transmission line 5. Likewise, the master terminal 6 is also connected to the transmission line 5 via the barrier 3 such that the master terminal 6 and the terminals 7 can communicate. It should be understood that, typically, only one of the terminals 7 communicates with the master terminal 6 at any given time. It should also be understood that, typically, each of the terminals 7 constantly draws a portion of the DC power, as will be described later.

The inductors 2a and 2b are provided between the bus power source 1 and the master terminal 6 to separate the DC power from the AC signals which are transmitted between the master terminal 6 and terminals 7. Further, the terminators 4a and 4b are connected to opposite ends of the transmission line 5, and each comprises, for example, a resistor and a capacitor for eliminating DC component in the transmitted signal.

FIGS. 8(a) and 8(b) are graphs illustrating a conventional relationship between the current drawn into one of the terminals 7 of the ISEP transmission system of FIG. 7 and the corresponding voltage along the transmission line 5 of the system during transmission and non-transmission states. This relationship is described in, for example, Section 7.3 (page 6), with reference to FIG. 5, of IFC Document No. 910425 28, "Guidelines for Physical Layer Testing Low Speed, Voltage Mode," which was distributed during a meeting of the IFC Physical Layer Technical Working Group on Apr. 9-11, 1991 in the Hotel Softel, Bloomington, Minn., U.S.A.

As shown in FIG. 8(a), during non-transmission, the terminal draws a constant current of 8 mA, a portion of which is used by the terminal as a power source for its internal circuitry. During transmission, the terminal sends a signal by changing the amount of current it draws from the transmission line 5 from a constant 8 mA to an AC current of 15 mA peak-to-peak (hereinafter referred to as "pp"). As shown in FIG. 8(b), the 15 mA pp current corresponds to a voltage signal on the transmission line 5 having a magnitude of 0.75 V pp, by virtue of the 50 Ω impedance of the transmission line 5.

If, for example, the 15 mA pp current is represented by the Manchester code, the duty ratio between the high level and the low level of the signal is equal, and the average value of the current drawn by the terminal during transmission is 8 mA which, incidentally, is the same as during non-transmission. This average value of 8 mA is one in which a slight margin is added to the average value of 15 mA pp, and is greater than the value which the terminal requires as its internal power source. In addition, the reason for changing the current in obtaining a voltage signal is that this method excels in that, as compared with the case where the voltage is directly changed, the signal voltage is constant irrespective of the presence or absence of the Zener barrier 3, and that protection of the transmission line 5 from short-circuiting is facilitated.

According to the above-described conventional transmission method, during non-transmission, each of the terminals 7 continuously draws from the transmission line 5 a current equal to the average current drawn during transmission. It should be noted that the current drawn during non-transmission, however, exceeds that which is required by the terminal as its own power source. Further, because the total amount of current supplied by the bus power source 1 to each of the terminals 7 is restricted to a certain value by the Zener barrier 3, the number of terminals which we may connect to the transmission line 5 is unnecessarily limited. For example, assuming that the maximum amount of current which can flow through the dangerous area D via the Zener barrier 3 is 36 mA, and assuming that each terminal draws an average current of 8 mA during both transmission and non-transmission, it follows that, at most, only 4 terminals can be connected to the transmission line 5 at any given time.

SUMMARY OF THE INVENTION

Accordingly, it is an object of the present invention to provide a method and apparatus for transmitting signals on a transmission line which overcomes the above-described problems associated with the conventional method. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described here, a method of transmitting signals on a transmission line is provided, the transmission line having a DC current flowing therethrough and having a plurality of terminals connected thereto in a multidrop fashion, each of the terminals being connected to the transmission line to draw a portion of the DC current during transmission and non-transmission of a signal, comprising the steps of maintaining a total amount of the DC current drawn from the transmission line by the terminals during non-transmission of the signal at a value smaller than an average amount of the DC current drawn from the transmission line by the terminals during transmission of the signal, and varying the portions of the DC current drawn by the terminals to transmit the signal on the transmission line.

Also in accordance with the purposes of the invention, a transmission line communication system is provided comprising a transmission line, a circuit for applying a DC current to the transmission line, and a plurality of terminals connected to the transmission line in a multidrop fashion, each of the terminals being connected to the transmission line to draw a portion of the applied DC current, each of the terminals including a circuit for varying the portions of the DC current drawn by the terminals to transmit a signal on the transmission line, and a circuit for, when the signal is not being transmitted, maintaining a total amount of the DC current drawn from the transmission line at a value smaller than an average amount of the DC current drawn from the transmission line, when the signal is being transmitted.

In a first aspect of the invention, an attempt is made to decrease the current drawn by the terminal from the transmission line during non-transmission so as to increase the number of terminals that can be connected in the ISEP system. In addition, if an arrangement is provided as in the first aspect of the invention, the average current changes during transmission and during non-transmission, so that the voltage on the transmission line oscillates. Since the signal is superimposed thereon, the reception of the signal becomes complicated. Therefore, in a second aspect of the invention, a threshold value for reception in a reception circuit is changed by following a change in the average voltage on the transmission line. In addition, as in a third aspect of the invention, the current is gradually increased from a certain value not less than a value required by the terminal as its own voltage and not more than the average value persisting during transmission, to the average value persisting during transmission, and upon completion of transmission the current is decreased, thereby simplifying the reception circuit.

BRIEF DESCRIPTION OF THE DRAWINGS

FIG. 2 is a circuit diagram illustrating an example of a terminal transmission circuit in accordance with the first embodiment of the present invention;

FIG. 3 is a circuit diagram illustrating an example of a terminal reception circuit in accordance with the first embodiment of the present invention;

DESCRIPTION OF THE PREFERRED EMBODIMENTS AND METHOD

Figure 1A:
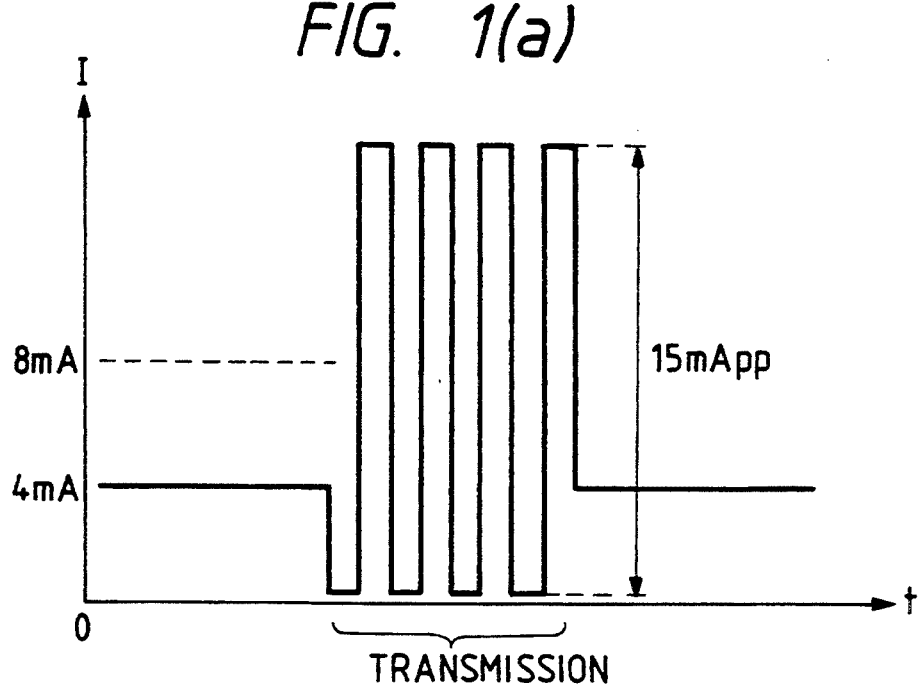
FIGS. 1(a)-1(b) are graphs for explaining an operation of a first embodiment of the present invention.

Reference will now be made in detail to the presently preferred embodiments and method of the invention as illustrated in the accompanying drawings, in which like reference characters designate like or corresponding parts throughout the several drawings.

First Embodiment

A first embodiment of the present invention will now be described with reference to FIGS. 1(a)-1(b), 2, 3, and 7.

Figure 1B:
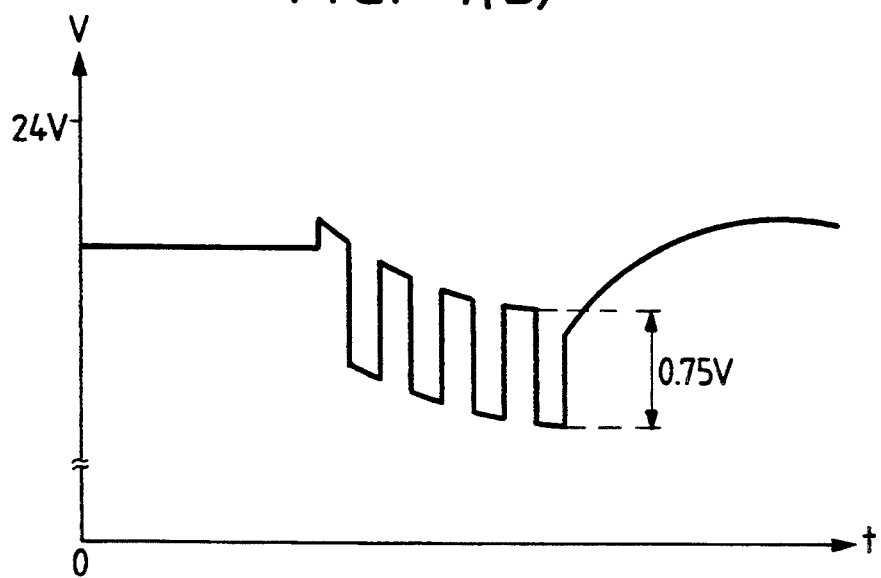

As shown in FIGS. 1(a)-1(b), there are provided graphs for explaining an operation of the first embodiment of the present invention. In particular, FIG. 1(a) illustrates a waveform representing the current drawn by one of the terminals 7 while FIG. 1(b) illustrates a waveform representing the corresponding voltage on the transmission line 5.

As shown in FIG. 1(a), during non-transmission, the terminal draws a constant current of 4 mA. However, during transmission, the terminal draws a current of 15 mA pp centered on 8 mA which, as shown in FIG. 1(b), corresponds to a 0.75 V pp voltage along the transmission line 5. Thus, during transmission, the average current drawn by the terminal increases from 4 mA to 8 mA.

Assuming that the maximum amount of current which can be supplied from the Zener barrier 3 to the dangerous area D is 36 mA and that, at most, only one terminal is transmitting at any one time, it is possible to connect up to eight terminals to the transmission line 5, as described by the following equation:

max. no. of terminals $\leq \{(36\ mA - 8\ mA)/4\ mA + 1\} = 8$

Hence, it can be appreciated that, in the present invention, the number of terminals which can be connected to the transmission line 5 is greater than that in the conventional transmission method.

As shown in FIG. 2 there is provided a circuit diagram illustrating an example of a terminal transmission circuit in accordance with the first embodiment of the present invention. In the drawing, reference numerals 11 and 14 denote operational amplifiers, 12 denotes a 2 V voltage reference such as an IC circuit for producing an accurate fixed voltage, 8-10, 17-20, and 40-41 denote resistors, 15 and 16 denote tristate gates, TXEN denotes a control signal which is high ("H") during transmission and low ("L") during non-transmission, and TXD denotes a data signal.

With reference to FIG. 2, the voltage at point A is constantly stabilized to 4.0 V by the 2 V voltage reference 12. The operational amplifier 11 uses the fixed voltage (2 V) as a reference voltage, and the like, and this voltage is used as an internal power source for each of the terminals 7. The tristate gate-16 receives as a control signal the TXEN signal such that when the TXEN signal is H, the tristate gate 16 is set in a shut-off (high impedance) state, and when the TXEN signal is L, the tristate gate 16 acts as a normal buffer. Similarly, the tristate gate 15 receives as a control signal an inverted TXEN signal such that when the TXEN signal is L, the tristate gate 15 is set in a shut-off state, and when the TXEN signal is H, the tristate gate 15 is set to H OR L in accordance with the TXD signal. Accordingly, during non-transmission, i.e., when the TXEN signal is L, the output of the tristate gate 15 becomes a high impedance, and the output of the tristate gate 16 becomes L, thereby imparting to the operational amplifier 14 such a reference voltage that will allow the operational amplifier 14 to stabilize the voltage at point B to 4.4 V. At this juncture, the current flowing across the resistor 13 of 100 Ω between points A and B becomes 4 mA, so that the terminal 7 draws the current of 4 mA from the transmission line.

Meanwhile, during transmission, i.e., when the TXEN signal is H, the output of the tristate gate 16 is a high impedance and the output of the tristate gate 15 is L or H in accordance with the TXD signal, thereby oscillating the reference voltage to be applied to the operational amplifier 14 centering on the 2 V voltage produced by the voltage reference 12. Since the operational amplifier 14 generates the voltage at point B oscillating between 4.05 V and 5.55 V in correspondence with the reference voltage, the terminal draws a current of 15 mA pp centering on 8 mA from the transmission line 5.

As shown in FIG. 3 there is provided a circuit diagram illustrating an example of a terminal reception circuit in accordance with the first embodiment of the present invention. In the drawing, reference numeral 21 denotes a comparator, 22 and 26 denote capacitors, and 23–25 and 27–28 denote resistors.

The comparator 21 is used for digitizing the received signal, and a signal in which a DC component of the voltage on the transmission line has been removed is applied to its noninverting input (+). The removal of the DC component is effected by the capacitor 22 and the resistors 23 and 24. A signal, obtained by further smoothing the aforementioned signal, the DC component of which has been removed, a smoothing circuit consisting of the resistor 25 and the capacitor 26, is applied to the inverting input (−) of the comparator 21. Since this signal serves as a threshold level when the signal at the noninverting input is digitized, even if the signal on the transmission line changes in the manner of the direct current, as shown in FIG. 1(b), the threshold value follows the same, so that it is possible to properly effect digitization. The resistors 27 and 28 preferably have a relatively high resistance in order to stabilize the operation of the comparator 21 even when there is no signal.

Second Embodiment

A second embodiment of the present invention will now be described with reference to FIGS. 4(a)–4(b), 2, 3, and 7.

Figure 4A:
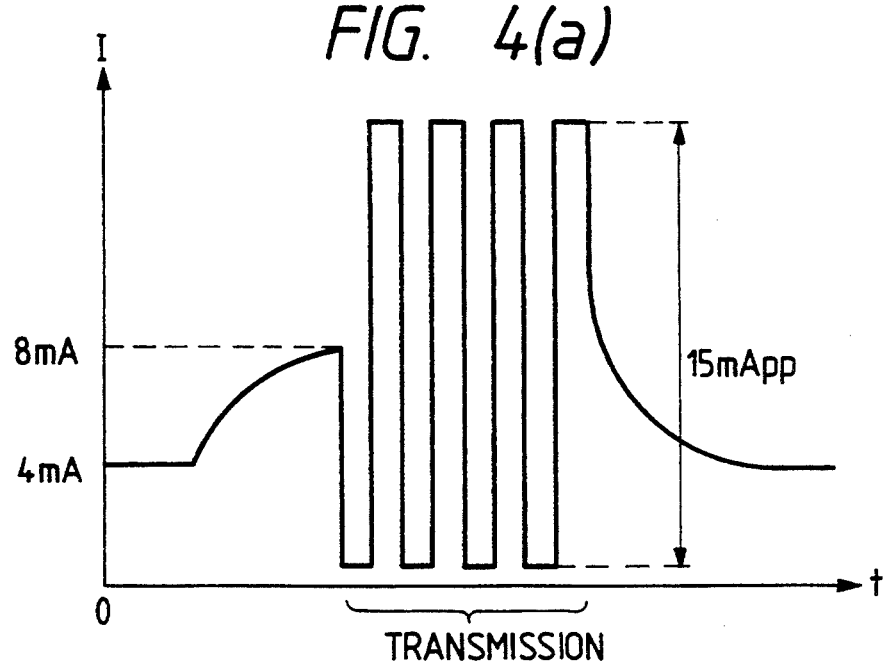
FIGS. 4(a)-4(b) are graphs for explaining an operation of a second embodiment of the present invention.
Figure 4B:
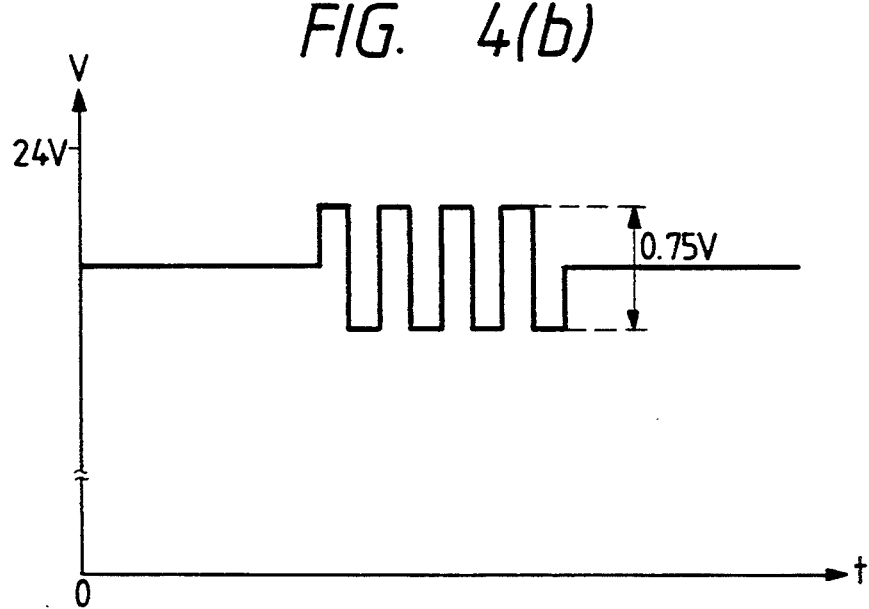

As shown in FIGS. 4(a)–4(b), there are provided graphs for explaining an operation of the second embodiment of the present invention. In particular, FIG. 4(a) illustrates a waveform representing the current drawn by one of the terminals 7 while FIG. 4(b) illustrates a waveform representing the corresponding voltage on the transmission line 5.

As shown in FIG. 4(a), the current of 4 mA (a value in which a certain margin is added to the current which the terminal requires as its power source) is drawn from the transmission line during non-transmission in the same manner as in the first embodiment shown in FIG. 1(a). However, unlike in FIG. 1(a), in FIG. 4(a), the current drawn at the start of transmission is gradually increased from 4 mA to 8 mA. Further, upon completion of transmission, the current is gradually decreased from 8 mA to 4 mA. Still further, during transmission, the current drawn into the terminal is changed in a range of 15 mA pp centering on 8 mA, and a voltage signal of 0.75 V pp is generated on the transmission line 5. As a result, because the average current changes gradually from 4 mA to 8 mA and then back to 4 mA, the voltage on the transmission line 5 just prior and immediately after transmission is steady and the 0.75 V pp signal is superimposed on a certain DC voltage, as shown in FIG. 4(b). Accordingly, to receive this signal, a complicated reception circuit such as the one shown in FIG. 3 is not required, and a simple reception circuit is sufficient. Finally, as in the first embodiment, a maximum of eight terminals can be connected to the transmission line 5.

Figure 5:
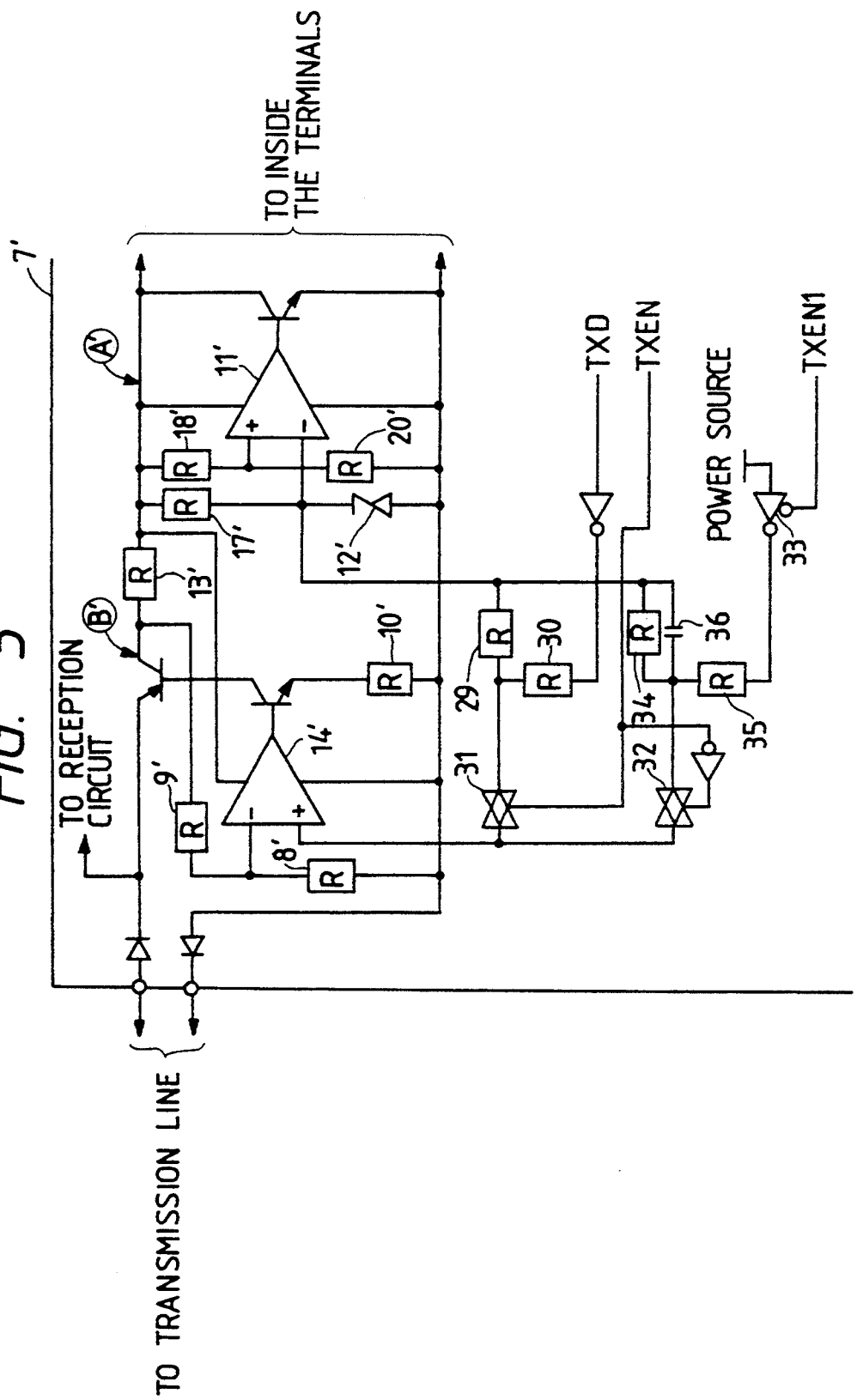
FIG. 5 is a circuit diagram illustrating an example of a terminal transmission circuit in accordance with the second embodiment of the present invention.

As shown in FIG. 5, there is provided a circuit diagram illustrating an example of a terminal transmission circuit in accordance with the second embodiment of the present invention. The terminal transmission circuit of FIG. 5 is nearly the same as that shown in FIG. 2 except that, for example, tristate gates 15 and 16 of FIG. 2 are replaced with analog switches 31 and 32, a tristate gate 33, resistors 29–30 and 34–35, and a capacitor 36.

As shown in FIG. 5, the voltage at point A′ is constantly stabilized to 4.0 V by means of the 2 V voltage reference 12′, the operational amplifier 11′, and the like, and is utilized as an internal power source of each terminal. During non-transmission, i.e., when both the TXEN signal and a TXEN1 signal are L, the output of the tristate gate 33 is L, the analog switch 31 is off, and the analog switch 32 is on, so that a reference voltage lower than the 2 V produced by the 2 V voltage reference 12′ is imparted to the operational amplifier 14′. As a result, the operational amplifier 14′ stabilizes the voltage at point B′ to 4.4 V. Hence, the current flowing through the resistor 13′ of 100 Ω between points A′ and B′ becomes 4 mA, so that the terminal draws a current of 4 mA from the transmission line 5.

Meanwhile, during transmission, the TXEN1 signal is first set to H. Then, the tristate gate 33 becomes a high impedance and the reference voltage to the operational amplifier 14′ is increased gradually to 2 V by the resistor 34 and the capacitor 36. At this time, if the voltage at point B′ is stabilized to 4.8 V by the operational amplifier 14′, the current flowing through the resistor 13′ of 100 Ω between points A′ and B′ becomes 8 mA. That is, the current which the terminal draws from the transmission line 5 increases gradually from 4 mA to 8 mA. Then, if the TXEN signal is set to H after a fixed time TR when the current reaches 8 mA, the analog switch 32 is turned off, and the analog switch 31 is turned on, so that the reference voltage imparted to the operational amplifier 14′ is oscillated and centered on 2 V in accordance with the TXD signal. In response to this reference voltage, the operational amplifier 14′ generates the voltage at point B oscillating in the range of 4.05 to 5.55 V, so that the terminal draws a current of 15 mA pp centering on 8 mA from the transmission line 5.

Upon completion of transmission, both the TXEN signal and the TXEN1 signal are set to L. As the TXEN signal is set to L, the analog switch 31 is turned off, the analog switch 32 is turned on, and 2 V is imparted to the operational amplifier 14' as the reference voltage. In addition, as the TXEN1 signal is set to L, the output of the tristate gate 33 becomes L, and the reference voltage imparted to the operational amplifier 14' is decreased gradually by the resistors 34 and 35 and the capacitor 36. After the lapse of a fixed time TF, the reference voltage returns to a certain voltage lower than the initial 2 V. At this time, since the operational amplifier 14' stabilizes the voltage at point B to 4.4 V, the current flowing across the resistor 13' of 100 Ω between points A and B becomes 4 mA. That is, the current which the terminal 7 draws from the transmission line 5 returns gradually to the original level of 4 mA.

Figure 6:
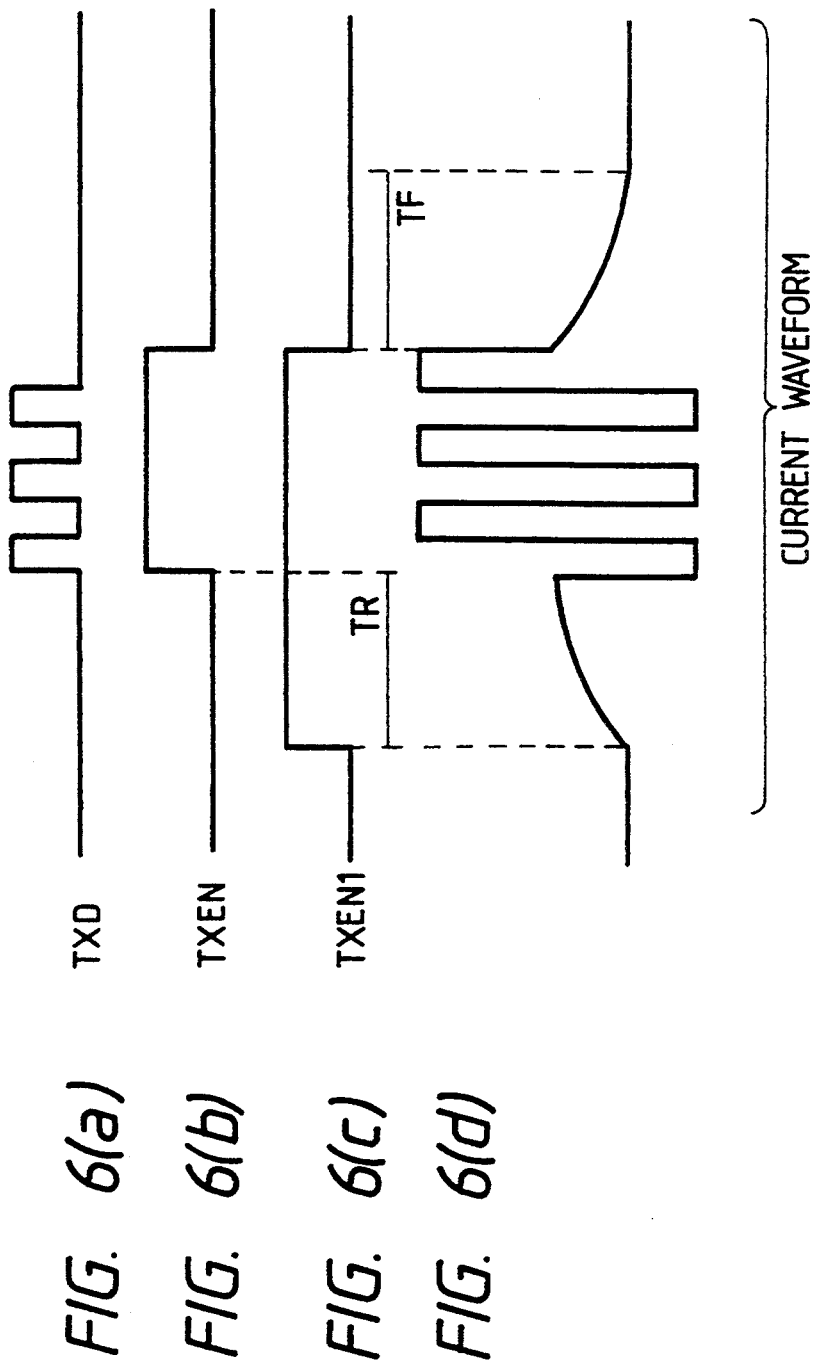
FIGS. 6(a)-6(d) are waveform diagrams for explaining an operation of the terminal transmission circuit of FIG. 5.
Figure 7:
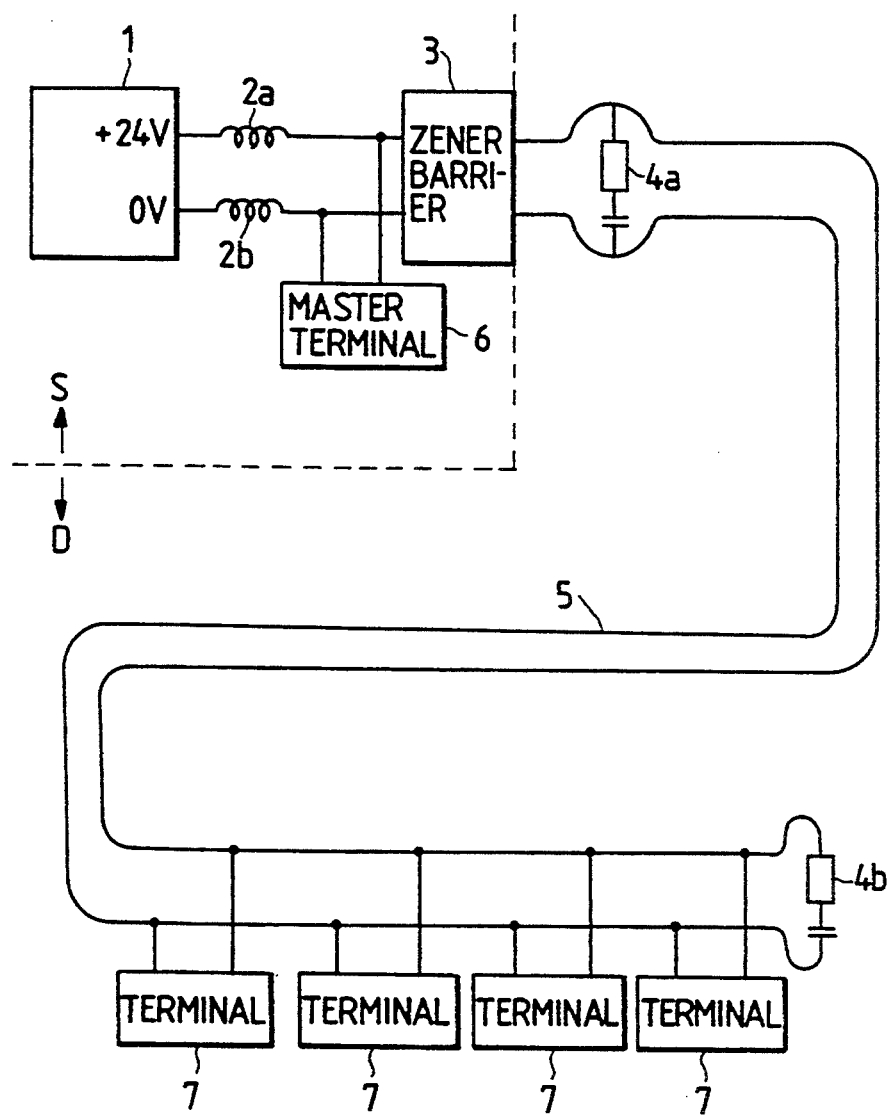
FIG. 7 is a diagram of a configuration illustrating a general example of an explosion-proof transmission system.
Figure 8A:
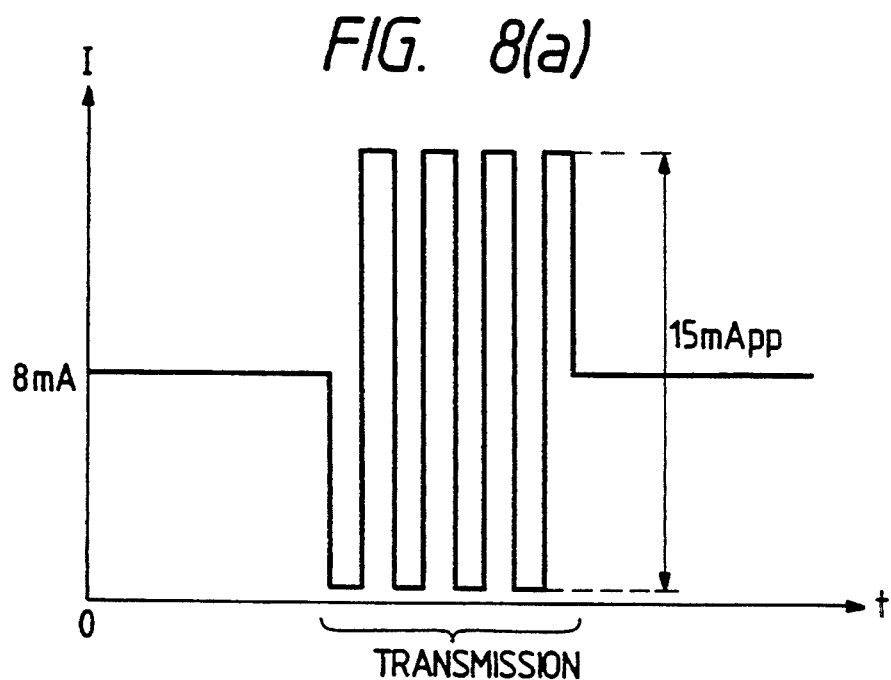
FIGS. 8(a)-8(b) are graphs for explaining a convention signal transmission method.
Figure 8B:
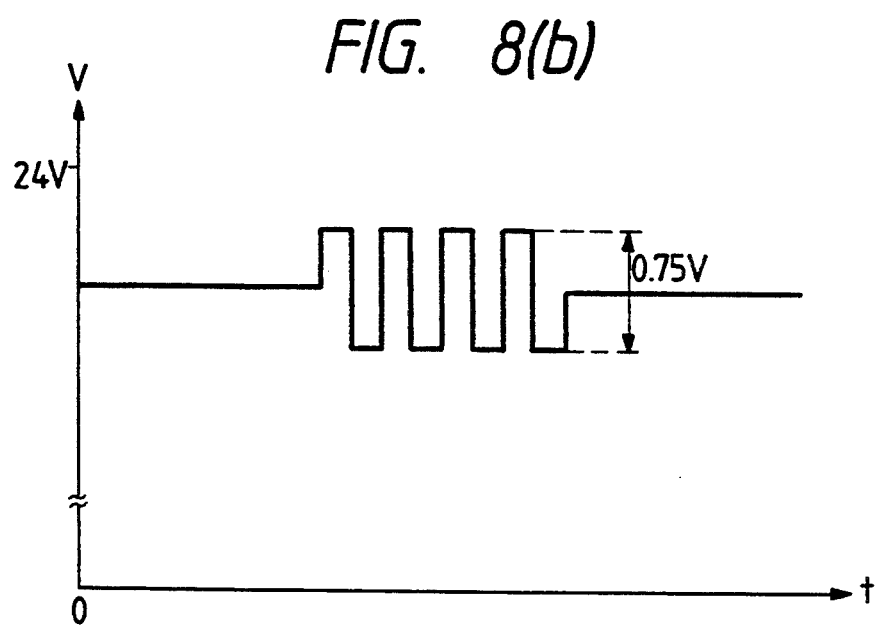

As shown in FIGS. 6(a)–6(d), there are provided waveform diagrams for explaining an operation of the terminal transmission circuit of FIG. 5. In particular, FIG. 6(a) represents the data TXD signal, FIG. 6(b) represents the TXEN signal, FIG. 6(c) represents the TXEN1 signal, and FIG. 6(d) represents the current waveform illustrated in FIG. 4(a).

It should be noted that although the above description assumes that the current which each of the terminals 7 requires as a power source is 4 mA, it goes without saying that this is a mere example, and that the present invention is not restricted to this value. That is, if the required current is smaller than 4 mA, the current which the terminal draws from the transmission line 5 during non-transmission can be made smaller, with the result that it becomes possible to further increase the number of terminals that can be connected to the transmission line 5.

In view of the foregoing description of the preferred embodiments of the present invention, it should be evident that, in the present invention, since the current which each terminal draws from the transmission line during non-transmission is reduced from an average value persisting during transmission to a minimum required value, it is possible to obtain the advantage that the number of terminals that can be connected to the transmission line 5 can be substantially increased.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method of transmitting signals on a transmission line, the transmission line having a DC current flowing therethrough and having a plurality of terminals connected thereto in a multidrop fashion, each of the terminals being connected to the transmission line to draw a portion of the DC current during transmission and non-transmission of a transmit signal, the method comprising the steps of:

maintaining an amount of the DC current drawn from the transmission line by each of the terminals during non-transmission of the transmit signal at a value smaller than an average amount of the DC current drawn from the transmission line by each of the terminals during transmission of the transmit signal;

varying the portions of the DC current drawn by the terminals to transmit the transmit signal on the transmission line;

receiving a receive signal on the transmission line; and digitizing said received receive signal in accordance with a threshold level equal to an average value of the received receive signal.

2. A method of transmitting signals on a transmission line, the transmission line having a DC current flowing therethrough and having a plurality of terminals connected thereto in a multidrop fashion, each of the terminals being connected to the transmission line to draw a portion of the DC current during transmission and non-transmission of a transmit signal, comprising the steps of:

maintaining an amount of the DC current drawn from the transmission line by each of the terminals during non-transmission of the transmit signal at a value smaller than an average amount of the DC current drawn from the transmission line by each of the terminals during transmission of the transmit signal;

varying the portions of the DC current drawn by the terminals to transmit the transmit signal on the transmission line;

the step of varying the portions of the DC current drawn by the terminals including the substeps of:
gradually increasing the amount of the DC current drawn from the transmission line from the value of the amount of the DC current drawn during non-transmission of the transmit signal to the average amount of the DC current drawn during transmission of the transmit signal; and upon completion of transmission of the transmit signal, gradually decreasing the amount of the DC current drawn from the transmission line from the average amount of the DC current drawn during transmission of the transmit signal to the value of the total amount of the DC current drawn during non-transmission of the transmit signal.

3. A transmission line communication system, comprising:

a transmission line:
means for applying a DC current to said transmission line; and a plurality of terminals connected to said transmission line in a multidrop fashion, each of said terminals being connected to said transmission line to draw a portion of said applied DC current, each of said terminals including:
means for varying the portions of said DC current drawn by each of said terminals to transmit a transmit signal on said transmission line;

means for, when said transmit signal is not being transmitted, maintaining an amount of said DC current drawn from said transmission line at a value smaller than an average amount of said DC current drawn by each of the terminals from said transmission line, when said transmit signal is being transmitted;

means for receiving a receive signal on the transmission line; and means for digitizing said received receive signal in accordance with a threshold level equal to an average value of the received signal.

4. A transmission line communication system, comprising:
- a transmission line;
- means for applying a DC current to said transmission line; and
- a plurality of terminals connected to said transmission line in a multidrop fashion, each of said terminals being connected to said transmission line to draw a portion of said applied DC current;
- each of said terminals including;
  - means for varying the portions of said DC current drawn by each of said terminals to transmit a transmit signal on said transmission line; and
  - means for, when said transmit signal is not being transmitted, maintaining an amount of said DC current drawn from said transmission line at a value smaller than an average amount of said DC current drawn by each of the terminals from said transmission line, when said transmit signal is being transmitted;
- said means for varying the portions of said DC current drawn by said terminals including:
  - means for, during transmission of said transmit signal, gradually increasing the amount of said DC current drawn from said transmission line from said value of said amount of said DC current drawn when said transmit signal is not being transmitted to said average amount of said DC current drawn when said transmit signal is being transmitted; and
  - means for, upon completion of transmission of said transmit signal, gradually decreasing the amount of said DC current drawn from said transmission line from said average amount of said DC current drawn when said transmit signal is being transmitted to said value of said amount of said DC current drawn when said transmit signal is not being transmitted.

* * * * *